United States Patent
Seki et al.

(10) Patent No.: US 10,095,098 B2
(45) Date of Patent: Oct. 9, 2018

(54) BOARD FOR PROJECTOR

(71) Applicant: IZUMI-COSMO CO., LTD., Osaka-shi, Osaka (JP)

(72) Inventors: Kazuharu Seki, Tokyo (JP); Tomoya Morita, Tokyo (JP)

(73) Assignee: IZUMI-COSMO CO., LTD., Osaka-shi, Osaka (JP)

( * ) Notice: Subject to any disclaimer, the term of this patent is extended or adjusted under 35 U.S.C. 154(b) by 0 days.

(21) Appl. No.: 15/211,744

(22) Filed: Jul. 15, 2016

(65) Prior Publication Data

US 2017/0059980 A1 Mar. 2, 2017

(30) Foreign Application Priority Data

Sep. 1, 2015 (JP) ................................. 2015-171829

(51) Int. Cl.
| | |
|---|---|
| G03B 21/14 | (2006.01) |
| G03B 21/30 | (2006.01) |
| G03B 21/10 | (2006.01) |
| F16M 13/02 | (2006.01) |
| G03B 21/56 | (2006.01) |

(52) U.S. Cl.
CPC ............. *G03B 21/30* (2013.01); *F16M 13/02* (2013.01); *G03B 21/10* (2013.01); *G03B 21/56* (2013.01)

(58) Field of Classification Search
CPC ........ G03B 21/54; G03B 21/14; F16M 11/12; F16M 13/02; F16M 11/04; F16M 11/20; F16M 11/24
USPC ............................................. 353/79; 248/449
See application file for complete search history.

(56) References Cited

U.S. PATENT DOCUMENTS 7,673,840 B2 * 3/2010 Weber ................... A47B 97/06
248/292.13

FOREIGN PATENT DOCUMENTS

JP 3864051 A 10/2006

* cited by examiner

*Primary Examiner* — Steven H Whitesell Gordon
*Assistant Examiner* — Jerry Brooks
(74) *Attorney, Agent, or Firm* — Flynn Thiel, P.C.

(57) ABSTRACT

A board 2 for a projector includes a movable arm 5 for moving a projector 1 to a use position in front of a projection board 3 and to a storage position above the projection board and a cam mechanism 6 for elevating the movable arm 5 while swinging it.
By elevation of the movable arm 5 by the cam mechanism 6, when the projector is positioned at the storage position, a body portion of the projector is positioned above an upper edge portion of the projection board, while when the projector is positioned at the use position, the body portion is positioned below the upper edge portion of the projection board.
Even a projector with a short focal distance can be moved to the storage position and to the use position.

4 Claims, 3 Drawing Sheets

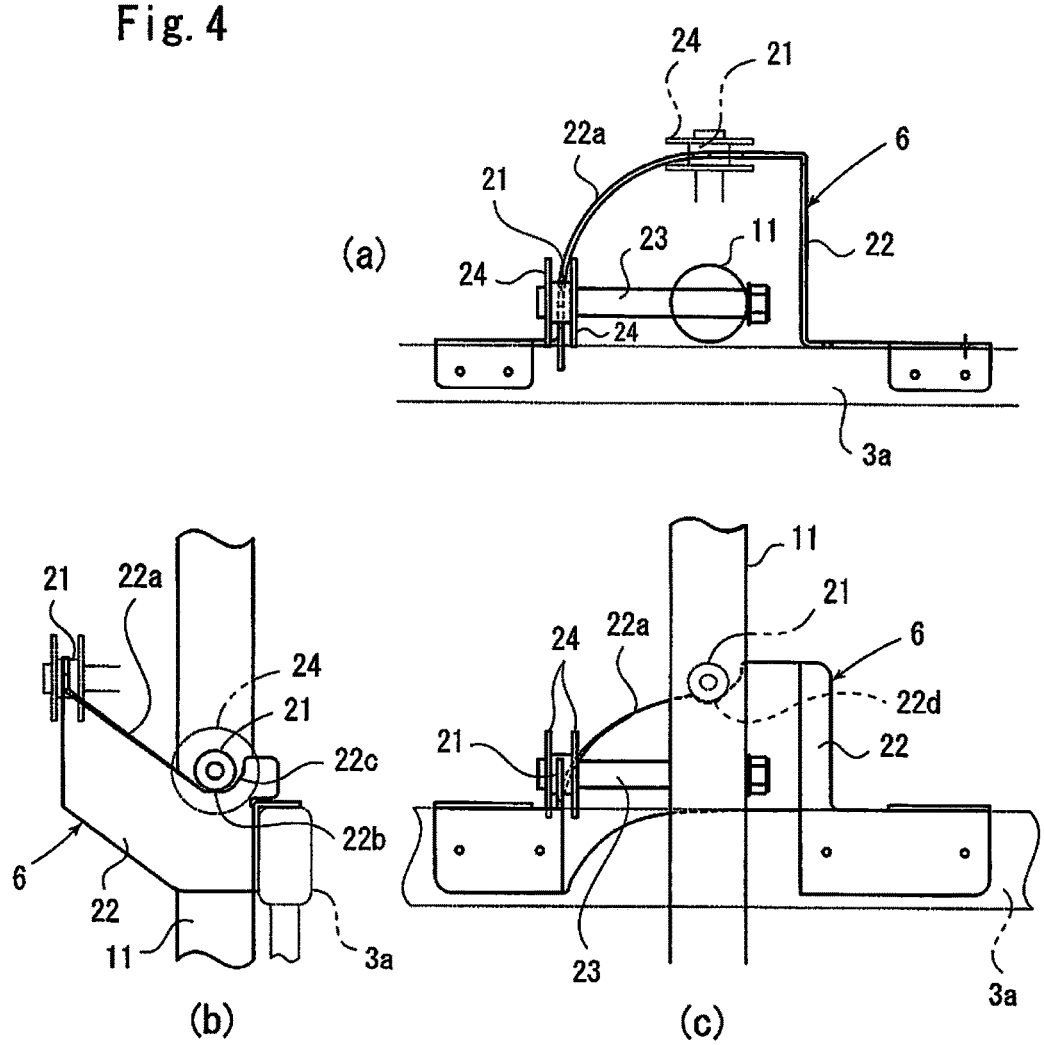

BOARD FOR PROJECTOR

FIELD OF THE INVENTION

The present invention relates to a board for a projector and more specifically to a board for a projector including a movable arm for moving the projector to a use position in front of a projection board and a storage position above the projection board.

DESCRIPTION OF THE PRIOR ART

Conventionally, an image radiated by a projector is projected onto a projection board, and as a board for a projector including the projection board as above, one constituted such that the projector is held by a swingably provided movable arm, for example, is known.

According to this board for a projector including the movable arm, the projector can be stored by moving the projector to the use position in front of the projection board and the storage position above the projection board (Published Registration No. 3864051).

Here, in the board for a projector in the aforementioned publication, when the projector is positioned at the storage position, a body portion of the projector protrudes to a side from an edge portion of the projection board.

However, when an ultra-short focus projector with a short focal distance is used as the projector, the movable arm needs to be shortened so as to bring the projection board and the projector close to each other, and if the projector is to be moved to the storage position in that case, it causes a problem that the body portion interferes with an upper part of the edge portion of the projection board.

SUMMARY OF THE INVENTION

In view of the problem as above, the present invention provides a board for a projector capable of moving even a projector with a short focal distance to the storage position.

That is, a board for a projector according to the present invention is characterized in that, in a board for a projector including a projection board onto which an image radiated by a projector is projected, a holding member fixed to the projection board, and a movable arm swingably provided on the holding member and for moving the projector to a use position in front of the projection board and a storage position above the projection board, a cam mechanism for elevating the movable arm while swinging it with respect to the holding member is provided;

by means of elevation of the movable arm by the cam mechanism, when the projector is positioned at the storage position, the body portion of the projector is positioned above an upper edge portion of the projection board, while when the projector is positioned at the use position, the body portion is positioned below the upper edge portion of the projection board.

According to the aforementioned invention, since the movable arm can be elevated by the cam mechanism while being swung, even in a projector with a short focal distance, the body portion of the projector does not interfere with the upper edge portion of the projection board at the storage position, and at the use position, the body portion is positioned below the upper edge portion of the projection board and thus, an image can be projected to the projection board appropriately.

BRIEF DESCRIPTION OF THE DRAWINGS

FIG. 4 are views for explaining a cam mechanism, in which FIG. 4(a) is a plan view, FIG. 4(b) is a side view, and FIG. 4(c) is a front view, respectively.

DETAILED DESCRIPTION OF THE EMBODIMENTS

Figure 1:
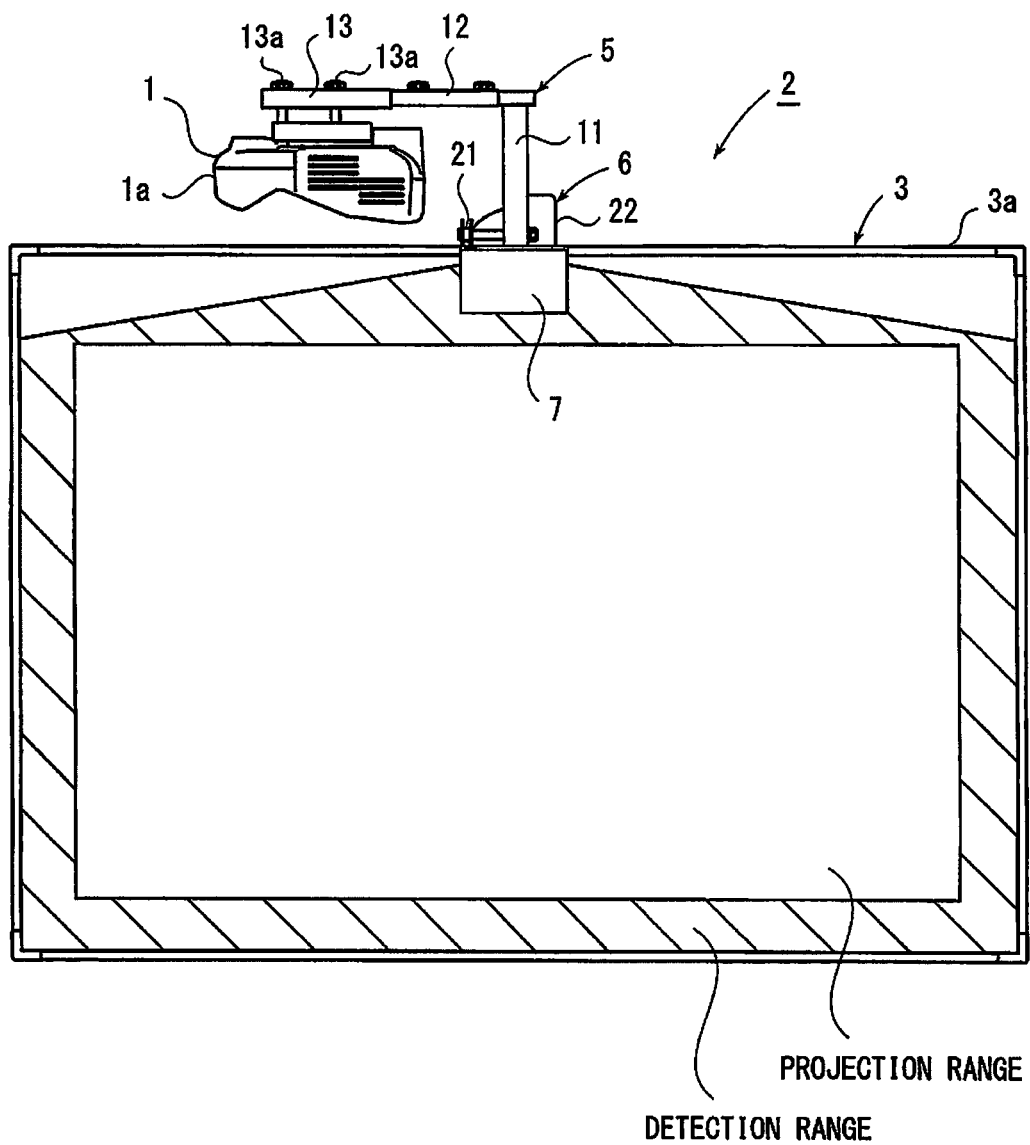
FIG. 1 is a front view of a board for a projector according to an embodiment.
Figure 2:
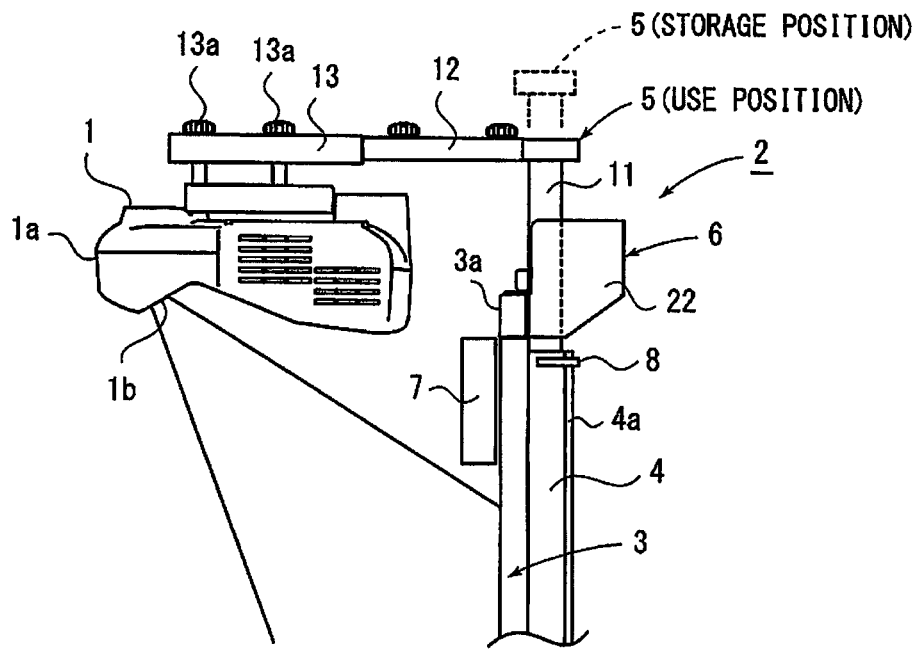
FIG. 2 is a side view of the board for a projector.
Figure 3:
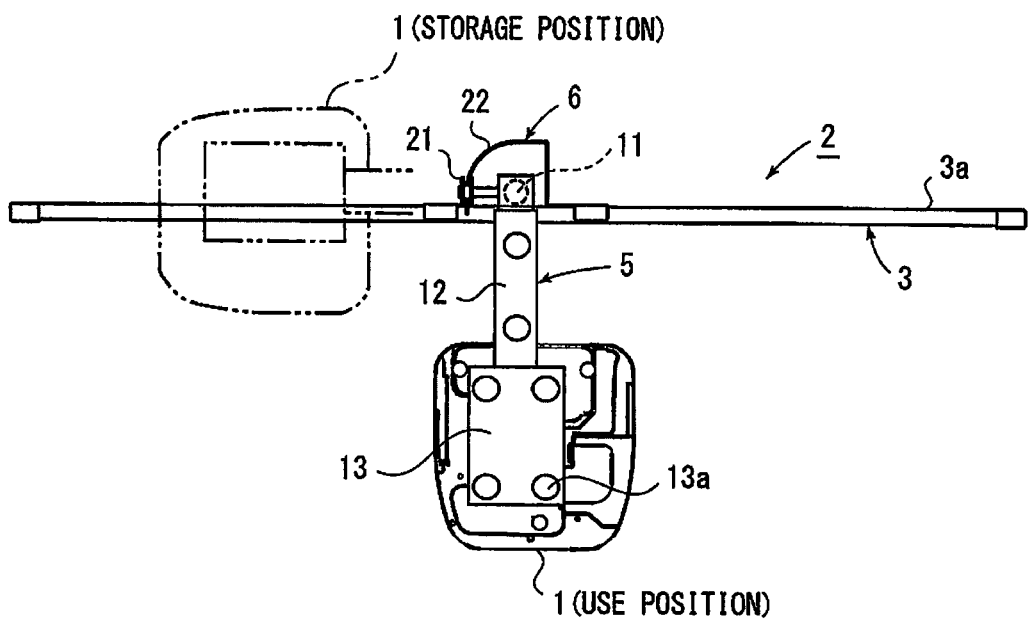
FIG. 3 is a plan view of the board for a projector.

An illustrated embodiment will be described below, and FIGS. 1 to 3 illustrate a board 2 for a projector on which a projector 1 for radiating an image is mounted, in which FIG. 1 is a front view, FIG. 2 is a side view, and FIG. 3 is a plan view, respectively.

The board 2 for a projector includes a projection board 3 onto which the image radiated by the projector 1 is projected, a holding member 4 fixed to the projection board 3, and a movable arm 5 swingably provided on the holding member 4 and moving the projector 1 to a lateral use position in front of the projection board 3 from a storage position above the projection board 3.

Moreover, the board 2 for a projector of this embodiment includes a cam mechanism 6 for elevating the movable arm 5 while swinging it with respect to the holding member 4, and when the projector 1 is positioned at the storage position, a body portion 1a of the projector 1 is positioned above an upper edge portion of the projection board 3, while when the projector 1 is positioned at a use position, the body portion 1a is positioned below the upper edge portion of the projection board 3.

The projector 1 of this embodiment has been well-known and includes a radiating lens 1b for radiating an image diagonally upward in an upper part of the body portion 1a which stores a light emitting means, a substrate and the like therein.

However, when the projector 1 is used for the board 2 for a projector as in this embodiment, the body portion 1a is fixed to the movable arm 5 in a vertically inverted state, whereby the image can be radiated diagonally downward from the radiating lens 1b positioned on a lower part.

Moreover, the projector 1 of this embodiment is a so-called ultra-short focus projector 1, and in order to project an image onto the projection board 3 corresponding substantially to a 82 type with a lateral width of approximately 170 cm, for example, the projector 1 only needs to be separated from the projection board 3 by approximately 20 cm.

Moreover, the projector 1 of this embodiment includes a sensor unit 7 for detecting a position of a finger of a user who touches the projection board 3, and the sensor unit 7 is provided substantially at a center in an upper part of the projection board 3.

The position of the finger detected by the sensor unit 7 is transmitted to the projector 1 or to a computer, not shown, connected to the projector 1, and the projector 1 changes the image to be projected in accordance with the position or movement of the finger so that the user can directly operate the image projected onto the projection board 3 by the finger.

A detection range by the sensor unit 7 is, as illustrated by hatching in FIG. 1, is set having a radial shape toward a lower part of the sensor unit 7, in other words, a portion immediately beside the sensor unit 7 is outside the detection range. Moreover, if there is a portion protruding forward from a surface to which the image is projected, that is, the surface the user touches, an outer side of this projecting portion cannot be detected.

Thus, if the projector 1 is positioned at the use position, the height of the projector 1 needs to be set so that a projection range of the image by the projector 1 is positioned inside the detection range of the sensor unit 7.

The projection board 3 is movable by a leg portion on which a caster is provided, though not shown, and thus, when the board 2 for a projector is to be moved, the projector 1 can be positioned at the storage position so that the projector 1 does not collide against equipment of a facility or the like.

On an edge portion on an outer periphery of the projection board 3, a frame 3a is provided for reinforcement, and the frame 3a protrudes slightly forward of the projection board 3 (see FIG. 4(b)).

Thus, the detection range of the sensor unit 7 outside the frame 3 is outside the range, and the sensor unit 7 itself needs to be provided inside the frame 3a.

The holding member 4 is a cylindrical member fixed to a back surface of the projection board 3, and inside the holding member 4, a cylindrical member 11 constituting the movable arm 5 is provided capable of sliding.

In an upper end portion of the holding member 4, a slit, not shown, is formed in an axial direction, and fixing means 8 called a so-called quick release is provided so as to penetrate two flanges 4a formed on opposite sides of the slit.

By opening the fixing means 8, the flanges 4a are separated from each other, which allow the rotation or elevation of the cylindrical member 11 held by the holding member 4, while by closing the fixing means 8, the flanges 4a get closer to each other and prevent the movement of the cylindrical member 11 so that the movable arm 5 is held at the use position or the storage position.

The movable arm 5 is constituted by the cylindrical member 11 held by the holding member 4, an arm portion 12 provided on an upper end of the cylindrical member 11, and connecting means 13 provided at a tip end of the arm portion 12 and connecting/holding the projector 1 to a lower surface thereof.

The arm portion 12 is constituted by a plurality of members so as to be capable of extension/contraction and of adjusting a distance between the projector 1 and the projection board 3 in accordance with the size of the projection board 3.

The connecting means 13 includes four screws 13a for adjustment, and by using these screws 13a for adjustment, the attitude of the projector 1 can be finely adjusted, and inclination of the projected image or the like can be modified.

Subsequently, the cam mechanism 6 will be described using FIG. 4, and the cam mechanism 6 in this embodiment is constituted by a cam follower 21 provided on the movable arm 5 and a cam member 22 provided on the projection board 3 and having an inclination portion 22a formed with which the cam follower 21 is brought into contact from above. FIG. 4(a) is a plan view, FIG. 4(b) is a side view, and FIG. 4(c) is a front view, respectively.

The cam follower 21 is provided at a tip end of a rod 23 penetrating the cylindrical member 11, and as illustrated in the plan view in FIG. 4(a), with the rotation of the cylindrical member 11, it is moved between the use position positioned on the left in the illustration with respect to the cylindrical member 11 and the storage position positioned above in the illustration.

Moreover, two disc-shaped plates 24 are provided on the rod 23 on opposite sides of the cam follower 21, and the plate 24 is formed having a diameter larger than that of the cam follower 21 so that, when the cam follower 21 moves, the finger of the user is prevented from being caught between the cam follower 21 and the inclination portion 22a.

The cam member 22 can be manufactured by bending a single plate made of iron and is fixed to the frame 3a on the upper part of the projection board 3 and is constituted to cover an outer periphery of the cylindrical member 11.

On an upper end of the cam member 22, the inclination portion 22a is formed with which the cam follower 21 is brought into contact from above, and the inclination portion 22a has, as illustrated in the plan view in FIG. 4(a), an arc-shaped path along a trajectory of the cam follower 21 moving with the rotation of the cylindrical member 11.

Moreover, as illustrated in FIGS. 4(b) and 4(c), the inclination portion 22a has an inclination for gradually elevating the cam follower 21 between the use position and the storage position and is constituted such that, by means of the elevation of the cam follower 21 with the rotation of the cylindrical member 11, the projector 1 fixed to the arm portion 12 integrally with the cam follower 21 is elevated.

That is, the height of the projector 1 at the use position and the storage position can be set by a height difference of the inclination in the inclination portion 22a.

Moreover, as illustrated in FIG. 4(b), a flat portion 22b is formed at a position adjacent to a lower end portion of the inclination portion 22a in the cam member 22, and a stopper portion 22c inclined upward is also formed at a position adjacent to the flat portion 22b.

When the projector 1 is positioned at the use position, the cam follower 21 is positioned on the flat portion 22b, and since this flat portion 22b has a predetermined length, the cam follower 21 becomes movable in a section in which this flat portion 22b is formed.

By forming the flat portion 22b as above, the projector 1 positioned at the use position can be moved horizontally within the range in which the flat portion 22b is formed, and the position of the projector 1 with respect to the projection board 3 can be finely adjusted.

After the fine adjustment is completed, by operating the fixing means 8 provided on the holding member 4, the projector 1 can be held so as not to move with respect to the projection board 3.

Subsequently, since the stopper portion 22c is provided with an inclination, when the cam follower 21 is brought into contact with this stopper portion 22c, the cam follower 21 can be decelerated and stopped by the inclination of the stopper portion 22c, and further rotation of the movable arm 5 can be prevented.

On the other hand, if the stopper portion 22c is formed in a perpendicular direction, since the cam follower 21 is stopped without deceleration at the perpendicular portion, a burden is placed on the cam follower 21 or the rod 23.

Moreover, as illustrated in FIG. 4(c), a recess portion 22d is provided at a position adjacent to an upper end portion of the inclination portion 22a in the cam member 22 and is constituted such that, when the projector 1 is positioned at the storage position, the cam follower 21 is fitted in the recess portion 22d.

The recess portion 22d has a substantially V-shape constituted by two inclination portions and is capable of positioning the cam follower 21 stored in the recess portion 22d by bringing it into contact with the two inclination portions and of stopping the projector 1 at the required storage position.

Moreover, similarly to the stopper portion 22c, since the recess portion 22d includes the inclination portions, the cam follower 21 having moved from the use position to the storage position is brought into contact with and rides over the inclination portions constituting the recess portion 22d and is decelerated and stopped, and the burden on the rod 23 of the cam follower 21 or the arm portion 12 can be alleviated.

According to the board 2 for a projector having the aforementioned constitution, in order to move the projector 1 to the use position or to the storage position, it is only necessary for the user to press the arm portion 12 in the horizontal direction.

Thereby, the arm portion 12 is swung around the cylindrical member 11, while the cam follower 21 constituting the cam mechanism 6 is moved vertically along the inclination portions 22a of the cam member 22, whereby the arm portion 12 is elevated.

As a result, the projector 1 connected to/held on the lower surface of the connecting means 13 of the arm portion 12 enables the body portion 1a to be positioned above the frame 3a above the projection board 3 for the storage position and enables the body portion 1a to be positioned below the frame 3a above the projection board 3 for the use position.

Moreover, by positioning the body portion 1a below the frame 3a above the projection board 3 for the use position, the projection range of the projector 1 can be positioned within the detection range by the sensor unit 7.

The projector 1 in the aforementioned embodiment is made capable of operating an image projected onto the projection board 3 by the finger of the user by including the sensor unit 7, but the board 2 for the projector of this embodiment can be also used for the projector 1 from which the sensor unit 7 is omitted.

Even in that case, in order to project the image at an appropriate position of the projection board 3, the body portion 1a of the projector 1 positioned at the use position can be positioned below the frame 3a above the projection board 3.

Moreover, as the projector 1 in the aforementioned embodiment, one including the radiating lens 1b on the upper part of the body portion 1a is used, but it is needless to say that a projector 1 having another constitution can be also used.

What is claimed is:

1. A board for a projector comprising a projection board on which an image radiated by a projector is projected, a holding member fixed to the projection board at an upper portion thereof, and a movable arm swingably provided on the holding member and configured to move the projector horizontally to a use position in front of the projection board from a storage position above the projection board, characterized in that:
   a cam mechanism for vertically elevating the movable arm while swinging the arm horizontally with respect to the holding member is provided above the projection board; and
   by means of elevation of the movable arm by the cam mechanism, when the projector is positioned at the storage position, the body portion of the projector is positioned above an upper edge portion of the projection board, while when the projector is positioned at the use position, the body portion is positioned below the upper edge portion of the projection board, characterized in that:
   the cam mechanism is constituted by a cam follower provided on the movable arm and a cam member provided on the projection board and on which an inclination portion with which the cam follower is brought into contact from above is formed;
   a flat portion is provided at a position adjacent to a lower end portion of the inclination portion in the cam member; and
   when the projector is positioned at a use position, the cam follower is positioned at the flat portion and allows swinging of the movable arm within a range in which the flat portion is formed.

2. The board for a projector according to claim 1, characterized in that:
   a stopper portion inclined upward is provided at a position adjacent to the flat portion in the cam member; and
   the cam follower is brought into contact with the stopper portion so as to prevent rotation of the movable arm.

3. The board for a projector according to claim 1, characterized in that:
   a recess portion with which the cam follower is fitted is provided at a position adjacent to an upper end portion of the inclination portion in the cam member; and
   when the projector is positioned at the storage position, the cam follower is positioned in the recess portion.

4. A board for a projector comprising a projection board on which an image radiated by a projector is projected, a holding member fixed to the projection board, and a movable arm swingably provided on the holding member and for moving the projector to a use position in front of the projection board and a storage position above the projection board, characterized in that:
   a cam mechanism for elevating the movable arm while swinging the arm with respect to the holding member is provided;
   by means of elevation of the movable arm by the cam mechanism, when the projector is positioned at the storage position, the body portion of the projector is positioned above an upper edge portion of the projection board, while when the projector is positioned at the use position, the body portion is positioned below the upper edge portion of the projection board;
   a sensor unit for detecting contact with the projection board is provided inside an edge portion surrounding an outer periphery of the projection board and substantially at a center of an upper part of the edge portion, and a detection range by the sensor unit is set below the sensor unit and inside the edge portion; and
   when the projector is positioned at the use position, the projection range of the image by the projector is positioned inside the detection range of the sensor unit.

* * * * *